United States Patent
Grant

(10) Patent No.: US 11,943,336 B2
(45) Date of Patent: Mar. 26, 2024

(54) USE OF GRADIENT DECENT FUNCTION IN CRYPTOGRAPHY

(71) Applicant: Theon Technology LLC, Newport Beach, CA (US)

(72) Inventor: Robert Edward Grant, Laguna Beach, CA (US)

(73) Assignee: Theon Technology LLC, Newport Beach, CA (US)

( * ) Notice: Subject to any disclaimer, the term of this patent is extended or adjusted under 35 U.S.C. 154(b) by 146 days.

(21) Appl. No.: 17/533,055

(22) Filed: Nov. 22, 2021

(65) Prior Publication Data

US 2023/0163952 A1    May 25, 2023

(51) Int. Cl.
*H04L 9/06* (2006.01)

(52) U.S. Cl.
CPC .................. *H04L 9/0656* (2013.01)

(58) Field of Classification Search
CPC .... H04L 9/0656; H04L 9/0662; H04L 9/0869
See application file for complete search history.

(56) References Cited

U.S. PATENT DOCUMENTS

| | | |
|---|---|---|
| 5,033,352 A | 7/1991 | Kellogg |
| 5,764,772 A | 6/1998 | Kaufman |
| 5,966,445 A | 10/1999 | Park |
| 6,072,876 A | 6/2000 | Obata |
| 6,154,541 A | 11/2000 | Zhang |
| 6,349,319 B1 * | 2/2002 | Shankar ............... G06F 7/5525 |
| | | 708/502 |
| 6,396,928 B1 | 5/2002 | Zheng |
| 6,480,605 B1 | 11/2002 | Uchiyama |
| 6,636,968 B1 | 10/2003 | Rosner |
| 6,751,736 B1 | 6/2004 | Bowman |
| 6,763,364 B1 | 7/2004 | Wilber |
| 6,990,200 B1 | 1/2006 | Kasahara |
| 7,502,754 B2 | 3/2009 | Campbell |
| 8,468,244 B2 | 6/2013 | Redlich |
| 8,516,244 B2 | 8/2013 | Waters |
| 8,885,820 B1 | 11/2014 | Lambert |
| 9,450,749 B2 | 9/2016 | Hammersmith |
| 10,230,703 B1 | 3/2019 | Lepore |
| 10,476,665 B1 | 11/2019 | Griffin |

(Continued)

FOREIGN PATENT DOCUMENTS

| | | |
|---|---|---|
| EP | 1220174 | 7/2002 |
| EP | 2680488 | 8/2019 |

(Continued)

OTHER PUBLICATIONS

Bhaumik, et al. "Safely Doubling your Block Ciphers for a Post-Quantum World," Inria, Paris. 2020. 49 pages, dated 2020.

(Continued)

*Primary Examiner* — Baotran N To
(74) *Attorney, Agent, or Firm* — Fish IP Law, LLP

(57) ABSTRACT

A method of encrypting and decrypting multiple individual pieces or sets of data in which a computing device randomly selects a group of seeds that it then uses to generate irrational numbers. Sections of the generated irrational numbers can be used as one-time pads or keys to encrypt the corresponding data sets. Intended recipients can then reverse the process using their allowed keys to access data for which they have authorization.

16 Claims, 6 Drawing Sheets

(56) References Cited

U.S. PATENT DOCUMENTS

| | | | |
|---|---|---|---|
| 10,911,451 B2 | 2/2021 | Costa | |
| 11,188,977 B2 | 11/2021 | Youb | |
| 11,443,310 B2 | 9/2022 | Bolla | |
| 2003/0016823 A1* | 1/2003 | Chung | H04L 9/0662 380/46 |
| 2003/0081785 A1 | 5/2003 | Boneh | |
| 2003/0115449 A1 | 6/2003 | Yochim | |
| 2004/0096056 A1 | 5/2004 | Boren | |
| 2006/0072745 A1 | 4/2006 | Fukaya | |
| 2006/0177065 A1* | 8/2006 | Halbert | H04L 9/0662 380/277 |
| 2007/0211893 A1 | 9/2007 | Frosik | |
| 2008/0107274 A1 | 5/2008 | Worthy | |
| 2008/0208560 A1 | 8/2008 | Johnson | |
| 2010/0119061 A1 | 5/2010 | Kawale | |
| 2012/0134495 A1 | 5/2012 | Liu | |
| 2013/0142323 A1 | 6/2013 | Chiarella | |
| 2013/0297937 A1 | 11/2013 | Fransen | |
| 2014/0112469 A1 | 4/2014 | Layne | |
| 2016/0012252 A1 | 1/2016 | Deleeuw | |
| 2017/0222804 A1 | 8/2017 | Dewitt | |
| 2017/0302446 A1 | 10/2017 | Thorwirth | |
| 2017/0310650 A1 | 10/2017 | McMullen | |
| 2018/0101322 A1 | 4/2018 | Cheriton | |
| 2018/0131526 A1 | 5/2018 | Ellingson | |
| 2018/0241548 A1* | 8/2018 | Dolev | H04L 9/0656 |
| 2019/0036678 A1 | 1/2019 | Ahmed | |
| 2019/0089532 A1 | 3/2019 | Lambert | |
| 2019/0120929 A1 | 4/2019 | Meadow | |
| 2019/0238323 A1 | 8/2019 | Bunch | |
| 2020/0084024 A1* | 3/2020 | Myers | H04L 9/0825 |
| 2020/0084037 A1 | 3/2020 | Zhang | |
| 2020/0136819 A1* | 4/2020 | Bae | H04L 9/3066 |
| 2020/0241841 A1 | 7/2020 | Tamiya | |
| 2020/0293212 A1 | 9/2020 | Narayanamurthy | |
| 2020/0366652 A1 | 11/2020 | Koyun | |
| 2020/0396059 A1 | 12/2020 | Micali | |
| 2021/0336766 A1* | 10/2021 | Kim | H04L 9/0869 |
| 2023/0007439 A1 | 1/2023 | Williams | |

FOREIGN PATENT DOCUMENTS

| | | |
|---|---|---|
| JP | 2007157288 | 6/2007 |
| WO | 0065768 | 11/2000 |
| WO | 2005085992 | 9/2005 |
| WO | 2016135726 | 9/2016 |
| WO | 2016203762 | 12/2016 |
| WO | 2019110955 | 6/2019 |

OTHER PUBLICATIONS

"Elliptic Curve Cryptography (Ecc)." 1 page, Nov. 2018.
"Elliptic Curve Over Finite Non-Prime Fields," Mathematics. 2 pages, dated Sep. 2020.
"Golden Ratio Calculator," Good Calculators. 2 pages, dated 2022.
Grant, et al. "Accurate and Infinite Prime Prediction from Novel Quasi-Prime Analytical Methodology." 8 pages, dated Mar. 2019.
Grant, Robert E. "Prime Number Pattern Discovery," Discoveries, Publications, Unified Math/Physics. Jul. 2018. 6 pages.
Kumar, et al. "A Symmetric Mecial Image Encryption Scheme Based on Irrational Numbers," Biomed Res 2018 Special Issue. S494-S498. 5 pages.
Grant, et al. "Reciprocal Wave Factorization," Strathspey Crown Holdings. Jun. 2020. 19 pages.
Barker, et al. "Recommendation for Pair-Wise Key Establishment Schemes Using Discrete Logarithm Cryptography," NIST. Apr. 2018. 2 pages.
Weisstein, Eric W. "Taniyama-Shimura Conjecture," Mathworld—A Wolfram Web Resource. 3 pages, dated Jul. 2022.
Wang, et al. "A Decentralized Electricity Transaction Mode of Microgrid Based on Blockchain and Continuous Double Action," IEEE. 2018. 5 pages.
"Why Are Elliptic Curves Constructed Using Prime Fields and Not Composite Fields?" https://crypto.stackexchange.com. 3 pages, dated Jan. 2017.
"Why is a Prime Number Used in ECDSA?" https://crypto.stackexchange.com/. 3 pages, dated Feb. 2020.
Wu, et al. "Forensic Analysis of Bitcoin Transactions," IEEE. 2019. 3 pages.
Burd, Barry. "A New Approach to Condensing Data Leads to a 99% Compression Rate," TechTarget. May 2015. 9 pages.
Zhang, et al. "A Blockchain-Based Authentication Method with One-Time Password," IEEE, 2019. 9 pages.

* cited by examiner

Figure 3

USE OF GRADIENT DECENT FUNCTION IN CRYPTOGRAPHY

FIELD OF THE INVENTION

The field of the invention is data security.

BACKGROUND

The background description includes information that may be useful in understanding the present invention. It is not an admission that any of the information provided herein is prior art or relevant to the presently claimed invention, or that any publication specifically or implicitly referenced is prior art.

Encryption relying on prime numbers or quasi-prime numbers, such as public-private key cryptography schemes (e.g., the RSA encryption scheme), has historically been extremely secure due to the computationally-intensive efforts needed to crack large public keys.

However, as computational resources evolve and new areas emerge (such as quantum computing), the security of these schemes will become weaker and weaker as prime numbers become easier to solve.

One-time pads for passwords are known to be completely secure. However, the use of one-time pads requires that the keys be shared between the parties ahead of time and only be used once. This means that for many exchanges, the parties must have a priori storage of many keys. The difficulties associated with these requirements has resulted in favoring the public key cryptography schemes over one-time pad schemes.

One-time pads for passwords are known to be have a high level of security. However, the use of one-time pads requires that the keys be shared between the parties ahead of time, and only be used once. This means that for many exchanges, the parties must have a priori storage of many keys. The difficulties associated with these requirements has resulted in favoring the public key cryptography schemes over one-time pad schemes.

My co-pending application Ser. No. 17/018,582 "Methods of Storing and Distributing Large Keys", discloses methods of using sequences within irrational or transcendental numbers as one-time key pads, and storing information for deriving such sequences instead of the entire sequences.

Others have attempted to solve this problem. WO 20190110955 to Bryant discusses the use of a one-time pad for password generation. However, the solution in Bryant requires the storage of all of the passwords in a large pad, which is resource intensive. WO 00/65768 to Persson discusses determining a maximum key length. However, the generation of the shortened key in Persson is performed in such a way that a function can still only be used once.

Thus, there is still a need for a system that securely protects a shared data set while adeptly providing the correct access to its users.

SUMMARY OF THE INVENTION

The inventive subject matter provides apparatus, systems and methods in which a computing device produces highly random numbers using a combination of (1) and AI interface, (2) a functions table, and (3) a random bits generator.

In embodiments, the inventive subject matter provides apparatus, systems and methods in which a computing device obtains a random selection of seeds, then proceeds to apply one or more functions against the selected seeds to produce corresponding irrational numbers. The computing device uses portions of the irrational numbers as one-time pads to encrypt corresponding individual pieces of data/data sets. For additional security, the computing device then avoids reusing the selected seeds. In embodiments, the computing device can delete the previously used seeds.

In embodiments, the seeds in the randomly-selected group are neither prime numbers nor quasi-prime numbers.

In embodiments, the computing device randomly selects seeds from a pool of seeds that was previously used to select random groups of seeds for prior operations.

To decrypt, a decrypting computing device obtains at least one seed and an indication of a function, and a start location and length, so as to generate a decryption one-time pad.

Various objects, features, aspects and advantages of the inventive subject matter will become more apparent from the following detailed description of preferred embodiments, along with the accompanying drawing figures in which like numerals represent like components.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

BRIEF DESCRIPTION OF THE DRAWING

Figure 3:
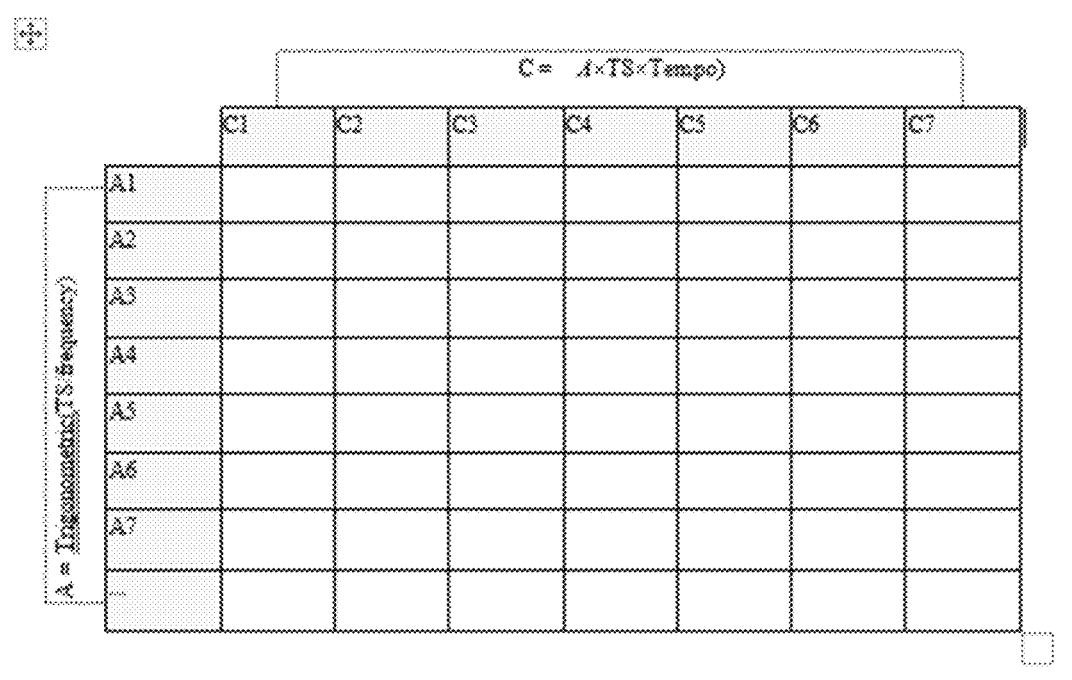

FIG. 3 provides a schematic representation of a small part of the Functions Table, according to embodiments of the inventive subject matter.

DETAILED DESCRIPTION

Throughout the following discussion, numerous references will be made regarding servers, services, interfaces, engines, modules, clients, peers, portals, platforms, or other systems formed from computing devices. It should be appreciated that the use of such terms, is deemed to represent one or more computing devices having at least one processor (e.g., ASIC, FPGA, DSP, x86, ARM, ColdFire, GPU, multi-core processors, etc.) programmed to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Figure 1:
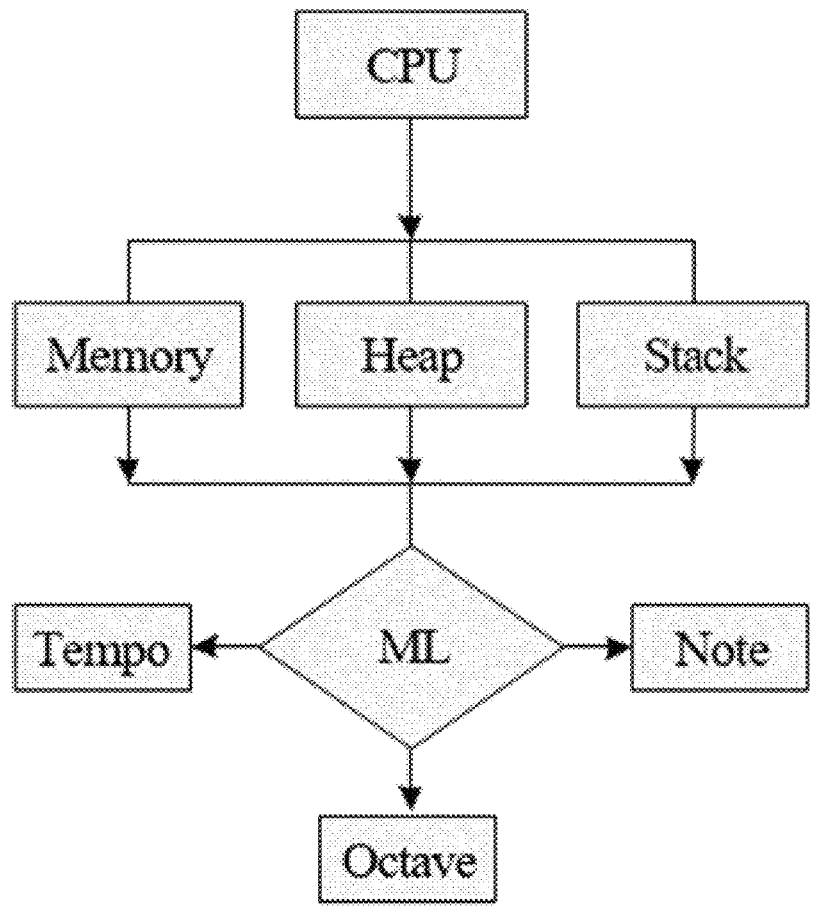
FIG. 1 is a diagrammatic overview of a system according to various embodiments of the inventive subject matter.

FIG. 1 provides a diagrammatic overview of a system 100 according to embodiments of the inventive subject matter.

The inventive subject matter provides apparatus, systems and methods in which a computing device produces highly random numbers using a combination of (1) and AI interface, (2) a functions table, and (3) a random bits generator.

A preferred embodiment of the inventive system and method is referred to herein from time to time as CrownRNG™. The CrownRNG™ design exploits the by-default randomness of irrational numbers.

Mathematically speaking, irrational numbers are those numbers that cannot be expressed as ratios of two or more rational numbers. They are proven to have digital sequences, also known as mantissas, that extend to infinity without ever repeating. Therefore, they are excellent sources for true randomness1.

Mathematical functions known to generate irrational numbers include the square roots of non-square numbers, e.g., square roots of prime numbers, ?20, ?35, etc., and also trigonometric functions having natural numbers for their arguments, among many other. (Please refer to Appendix A for a list of some irrational numbers' generating functions).

The basic idea behind CrownRNG is to use the power of artificial intelligence (AI) to create mathematical functions able to generate random irrational numbers. The irrational numbers will function as parameters to be used to generate highly randomized sequences of binary bits that are suitable for encryption purposes.

The CrownRNG unit generally comprises three main components:

1—An AI interface.
2. A Functions Table.
3. A Random Bits Generator (RBG).
1. The AI interface:

The AI interface utilizes the learning capabilities of artificial intelligence to learn how to generate randomized parameters needed by the system.

The AI is initialized by a set of CPU metrics coming from the hosting PC. It uses these metrics as initial features to learn from and to then evolve via linear-regression-based Machine-Learning (ML) algorithm.

One branch of the AI, the MusicAI, will compose random music pieces that will transform into a set of numbers corresponding to the octaves, notes, and tempi of the music piece. These three values are then converted, via digital root arithmetic, into specific ranges such that they can be utilized by the Functions Table.

The other branch of the AI, the MathAI, uses ML to create ever-changing mathematical formulae tuned to create random non-square numbers (N). The square roots of these non-square numbers create numbers with irrational mantissas. These irrational numbers will be truncated to specific bit-lengths dictated by the private keys' security level and then will be passed on to the RBG as seeds.

The MusicAI:

The main workflow of the MusicAI can be summarized as follows:

First, three parameters of the CPU are collected: the allocated memory, allocated heap, and stack. These three values will be collected in intervals of 1 millisecond for a total of 5 seconds. This will generate 5000 data points for each.

Next, the AI will start doing supervised machine learning on these values, treating two as features and one as the predicted label.

Using a linear regression model, two features, let say the memory and heap, will learn to predict the stack label, then the model will collect new values for the features and start predicting the heap label. The same machine-learning algorithm will be used, but with the labels being the other two features instead.

So, in total, we have three AI algorithms working simultaneously to predict three labels, memory, heap, and stack.

The three predicted values are truncated, using modular math, into specific values depending on their allocated variables, as shown in the table below.

TABLE.1

The features/labels transformation of the CPU metrics.

| Features | Label | Variable | Mod |
|---|---|---|---|
| Heap | Memory | Stack | Note | 7 |
| Heap | Stack | Memory | Tempo | 6 |
| Memory | Stack | Heap | Octave | 12 |

The stack values will be allocated to the note variable and hence be truncated to mod(7), in other words, eight values from 0 to 7. The memory values will transform into the tempo using mod(6), and finally, the heap variables will transform into the octave, using mod(12). These three values will then pass on to the function table, as we to be explained later.

1. The MathAI:

The MathAI shares the same supervised machine learning algorithm with the MusicAI. However, for this case, the three predicted values of the memory, heap, and stack are truncated using mod(10). The operation is repeated, and the values are concatenated to form one single number of a specific length, specified by the programmer.

A single-digit of either [2, 3, 7, 8] is randomly chosen and then added to the end of the concatenated number, whenever needed, to ensure that the number is not a perfect square. This is because no number, when squared, will end with either of these four digits. The final number is then square-rooted and passed on to the next element.

In summary, the AI outputs the following parameters:
a. The irrational seed. An infinite irrational number truncated to a specific length.
b. The tempo, note, and octave parameters in the ranges of (0-7), (0-8), and (0-13), respectively.

Figure 2:
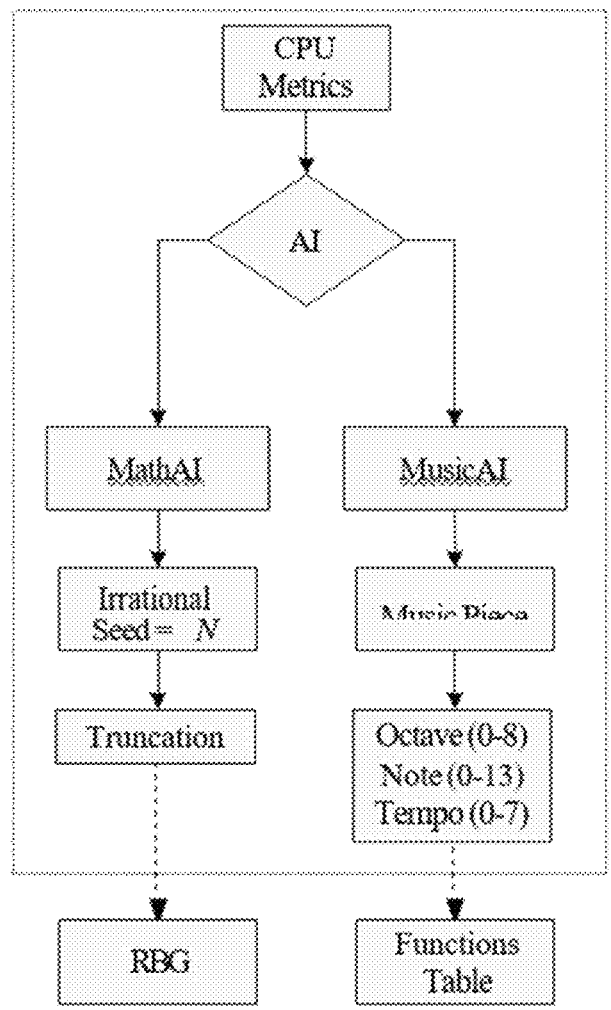
FIG. 2 provides a schematic representation of the AI general workflow, according to embodiments of the inventive subject matter.
Figure 4:
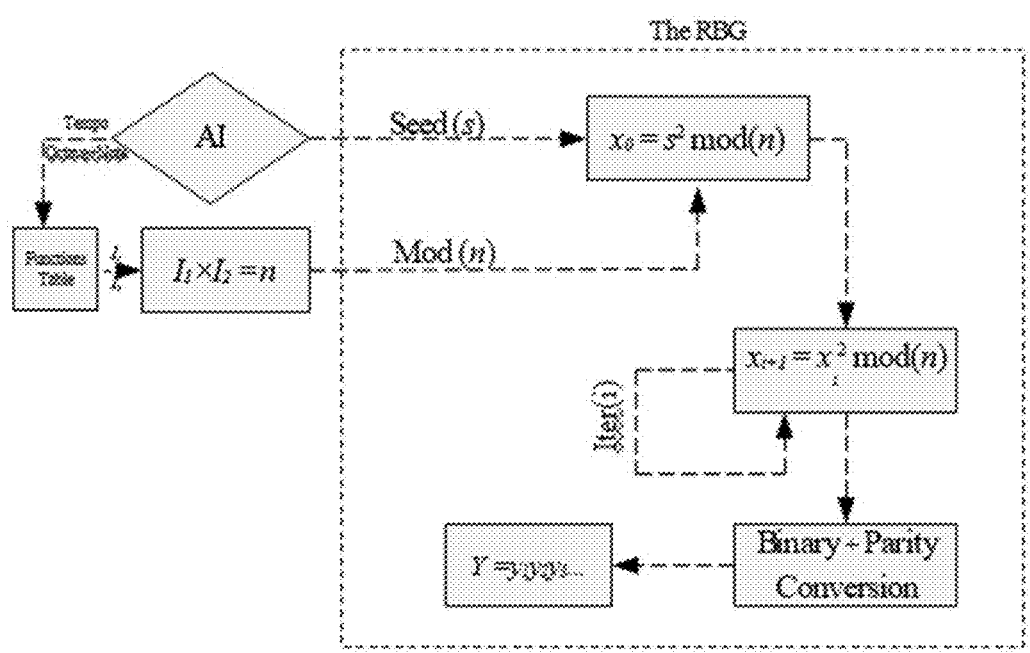
FIG. 4 provides a schematic representation of the RBG workflow, according to embodiments of the inventive subject matter.

FIG. 2 is a schematic rendering of the workflow of the AI.

2. The Functions Table

The Functions Table is defined by a set of horizontal and vertical variables that are mathematical functions proven to always produce perfect irrational numbers. The arguments of these functions are not fixed, determined by the random internal states, mainly the timestamp of the current time, as well as the tempo variable.

The tempo, note, and octave parameters coming out of the AI will be used to determine which two cells on the vertical and horizontal axis will be utilized for the current run. The output of these cells (the irrational mantissas) will then be truncated accordingly and used to compute the arithmetic mode by which the RBG will operate.

For our current model, we use the square root function on the horizontal axis of the table and trigonometric ones on the vertical axis.

There are seven cells on the horizontal axis (FIG. 2), with the argument of the square roots being the product of the tempo value, the timestamp (TS), and a non-square number (A) as follows: sqrt (TS x Tempo x A). (This non-square number A is not the same as the N used to generate the seed.)

The horizontal scale is made of 104 cells corresponding to 13 octaves, with each octave divided into eight notes. The octave parameter will first select one of the 13 octaves, and then the note parameter will select which note of this specific octave will be used. Each note corresponds to a trigonometric function having an argument made of the time stamp divided by a specific frequency value: TS/fr.

The trigonometric functions, along with the frequencies of the notes of the 13 octaves, are listed in the table below.

TABLE 2

A list of the trigonometric functions used along with the music frequencies of each octave.

| Sin | 432 × 100 | 450 | 468 | 252 | 270 | 288 | 306 | 324 | 342 | 360 | 378 | 396 | 414 |
|---|---|---|---|---|---|---|---|---|---|---|---|---|---|
| Cos | 864 × 100 | 900 | 936 | 504 | 540 | 576 | 612 | 648 | 684 | 720 | 756 | 792 | 828 |
| Tan | 1728 × 10 | 1800 | 1872 | 1008 | 1080 | 1152 | 1224 | 1296 | 1368 | 1440 | 1512 | 1584 | 1656 |
| Ctan | 3456 × 10 | 3600 | 3744 | 2016 | 2160 | 2304 | 2448 | 2592 | 2736 | 2880 | 3024 | 3168 | 3312 |
| Sec | 6912 × 10 | 7200 | 7488 | 4032 | 4320 | 4608 | 4896 | 5184 | 5472 | 5760 | 6048 | 6336 | 6624 |
| Csc | 13824 | 14400 | 14976 | 8064 | 8640 | 9216 | 9792 | 10368 | 10944 | 11520 | 12096 | 12672 | 13248 |
| Sin | 27648 | 28800 | 29952 | 16128 | 17280 | 18432 | 19584 | 20736 | 21888 | 23040 | 24192 | 25344 | 26496 |
| Cos | 55296 | 57600 | 59904 | 32256 | 34560 | 36864 | 39168 | 41472 | 43776 | 46080 | 48384 | 50688 | 52992 |

Once the two irrational values of the horizontal and the vertical cells are calculated, they will be truncated accordingly and then passed on, along with the seed, to the RBG.

3. The Random Bit Generator (RBG)

The RBG utilizes a specific mathematical function that takes the seed output of the AI as its initial argument and the two irrational numbers of the Functions Table as the arithmetic mod parameters. From there, it iterates on each calculated value to calculate new ones that are then concatenated to create a randomized sequence of bits.

The RBG general design is based on the cryptographically-secure Blum-Blum-Shub (BBS) generator2. But while the arithmetic mod in the original BBS is computed from the product of a couple of prime numbers, in the CrownRNG case, we use the truncated irrational numbers coming from the Functions Table instead.

We can think of the RBG function as occupying the inner cells of the Function table, taking its parameters from the X and Y axis, and outputting a value based on these parameters and the seed.

The general concept of the BBS generator goes as follows:

1. Two primes p and q of specific bit-length are chosen such that each is congruent to 3 modulo 4: p≡q≡3 mod(4). (In the CrownRNG case, the two primes are replaced with two truncated irrational numbers, I1 and I2, that satisfy the same mod(4) requirement.)
2. The two prime numbers (irrational numbers in our case) are multiplied to generate n, the arithmetical mode by which the generator will perform its calculations.
3. A random integer s (the seed) is generated from another physical true random number generator, having a length in the interval of [1, n−1] (in the CrownRNG case, the seed is generated by the AI.)
4. The seed will initiate the generation process through the operation $x_0 = s^2 \mod(n)$.
5. The function $x_i = x_{i-1}^2 \mod(n)$ is then used to iterate over each previously calculated value, generating new values for every iteration and outputting a string of numbers: $x_1, x_2, x_3, \ldots, x_k$.
6. Next, the output values are converted into a string of binary bits.
7. The bit-parity of each binary number is determined depending on the type of parity, even or odd (0 or 1).
8. Finally, the parity digits are concatenated to form the desired CSPRN, depending on the required bit-length of the key, which also determines the level of security: $Y = y_1 y_2 y_3 \ldots y_k$.

As mentioned above, the only modification the RBG introduces to the original BBS is replacing the prime numbers with the irrational ones. The usage of prime numbers in the original BBS is a must if we want to have the ability to reverse the direction of the generator, as in the case when the BBS system is used as an encryption/decryption algorithm. However, as we do not want to reverse the operation in our system, there is no problem with using numbers that are not prime. In fact, this introduces additional security to the system because when we compare the limited amount of prime numbers having specific bit-length to the infinite amount of potential irrational numbers of the same bit-lengths, the infinity factor introduces an extra advantage when it comes to the security of the generator against cyber-attacks that try to predict these values.

Figure 5:
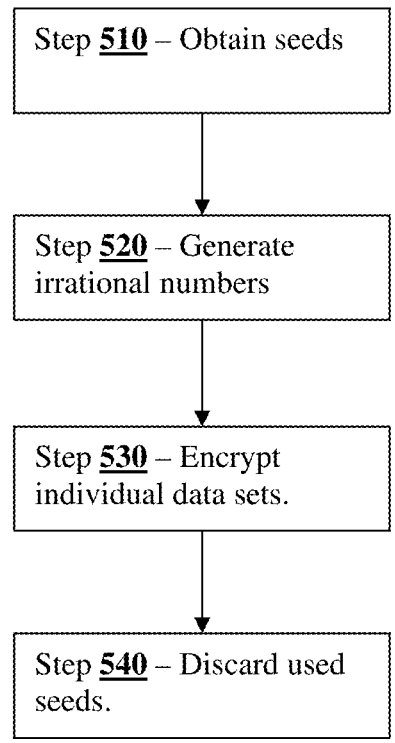
FIG. 5 shows a flowchart of a method of securing data, according to embodiments of the inventive subject matter.

FIG. 5 shows a flowchart of a method of securing data, according to embodiments of the inventive subject matter.

At step 510, a computing device obtains a random selection of seeds. The seed can be selected in several ways.

In embodiments, the seed is selected randomly from among numbers that are neither prime numbers nor quasi-prime numbers.

In embodiments, the seed is randomly selected from among a plurality of numbers that are over a thousand digits long. In other embodiments, the seed is randomly selected from among a plurality of numbers that are over ten thousand digits long.

At step 520, the computing device uses the seeds to generate irrational numbers. The generation of irrational numbers is discussed in further detail below.

Figure 6:
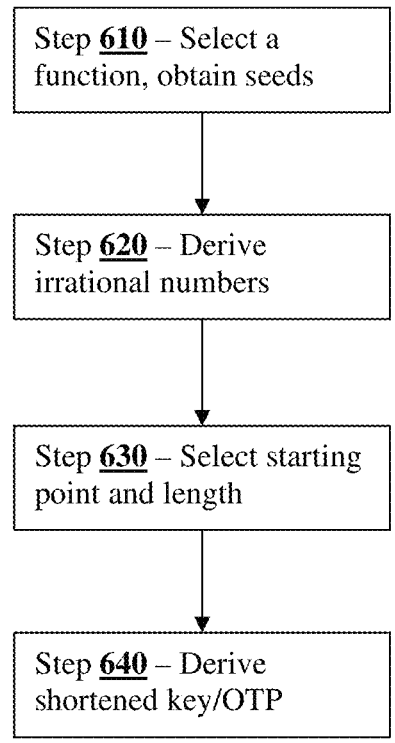
FIG. 6 illustrates the processes associated with encrypting a set of data according to embodiments of the inventive subject matter.

FIG. 6 illustrates the processes associated with encrypting a set of data according to embodiments of the inventive subject matter. Steps 610-660 cover the process of encrypting a message or data.

At step 610, the sending computing device selects a function to be used to obtain an irrational number. The function can be a mathematical function or algorithm as discussed further herein. The function can be selected according to a pre-determined order or schedule. Alternatively, it can be randomly selected or user-selected. The computing device obtains the selected function from the stored functions in a functions database.

At some point prior to step 620, the computing device also obtains a plurality of seeds, as discussed above.

At step 620, the computing device solves the function using each of the selected seeds to obtain a corresponding irrational number. Irrational numbers have an infinite or near-infinite amount of decimal places. Thus, the function is a function whose output is an irrational number. By using an irrational, the systems and methods of the inventive subject matter have the flexibility to obtain many encryption keys from the same function without repeating some or all of the encryption keys. Because irrational numbers do not have a pattern, the systems and methods of the inventive subject matter can ensure true randomness in the generation of cryptography keys. For example, the function can be to take the square root of a non-perfect square number. This results in an irrational number. In an illustrative example, the function to be solved can be the square root of 20.

In embodiments, solving the function comprises taking an inverse of each of the selected seeds.

In embodiments, the irrational number is calculated by calculating the root of the seed.

In embodiments, the root can be a square root or a cube root. In other embodiments, the root can be a fractional root.

In embodiments, the irrational number can be a root of a number that comprises the seed and that ends in 2, 3, 7 or 8.

In embodiments, the same function is not applied to all of the obtained seeds. In these embodiments, the computing device selects a first function and applies it to a first subset of the obtained seeds. The computing device then selects a second function and applies it to a second subset of the obtained seeds. The total group of selected seeds can be subdivided into additional subsets and have additional functions applied to them.

At step 630, the computing device selects a starting point and a length within the mantissa of each irrational number calculated for each seed. The starting point designates a start digit in the mantissa. The length designates the number of digits following the start digit. The start digit and length are preferably integer values such that they identify a precise digit location and precise length.

At step 640, the computing device applies the starting point and length to the decimals of the mantissa to result in a shortened key or one-time pad, which is a portion of the mantissa. Thus, the one-time pad is a key that starts at the start digit and contains the digits following the start digit according to the length.

In embodiments, the one-time pad can be at least 10,000 digits long. In other embodiments, the one-time pad comprises at least as many digits as data positions in the data. In still other embodiments, the binary representation of the one-time pad comprises at least as many digits as the binary representation of the data to be encrypted. After step 640, the process continues to step 530 of FIG. 5.

The techniques used to generate and use the encryption/decryption keys using a mathematical function are described in greater detail in the inventor's own pending U.S. patent application U.S. Ser. No. 17/018,582 filed Sep. 11, 2020, entitled "Method of Storing and Distributing Large Keys", which is incorporated herein by reference in its entirety.

At step 530, the computing device uses the generated portion of the mantissas of each of the irrational numbers as a one-time pad to encrypt individual ones of multiple pieces or sets of data. The encrypted data can then be stored by the computing device locally or at a remote database.

At step 540, the computing device updates its records of used seeds and discards those seeds. Discarding the seeds can involve deleting the seeds from the database that stores the seeds In a variation of these embodiments, the computing device can discard the starting points and lengths used such that the seeds themselves can be reused but the starting points and lengths are not such that the actual one-time pads used for encryption cannot be recreated by the computing device.

In embodiments, the first portion (which can be or can include the seed) can be distributed via a graphical code. This graphical code could be a QR code. In a variation of these embodiments, the QR code can contain additional codes that help to obfuscate the public key.

To decrypt the encrypted data at a future time, the computing device (or another computing device that is the recipient of the encrypted data) can apply the same seeds to the function to generate the mantissa and one-time pad as discussed above, to generate an identical key that can be used for decryption.

In situations where a receiving computing device is decrypting the data, the sending computing device can send the seed and an indicator of a function. The receiving computing device would already have the functions (or pointers to these functions) stored as part of an initial shared secret established prior to the data transmission. The receiving computing device would also receive or otherwise obtain the starting points and lengths for each of the one-time pads it needs. The seed(s) can be transmitted as part of a graphical code as discussed above.

A benefit of this approach is that for each potential recipient that may be authorized to access to some of, but not all of, the individual encrypted data sets, the system can provide access to only the data sets that particular recipient is authorized to access. To do so, the computing device can send the necessary decryption information for only the authorized data sets. This way, the recipient computer device can only decrypt and access the data for which it has the decryption tools.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of encrypting and decrypting multiple pieces of data, comprising:
using a computing device to provide a random selection of seeds;
applying at least one function against the random selection of seeds to produce corresponding irrational numbers;
using portions of the mantissas of the irrational numbers as one-time pads;
applying the one-time pads to encrypt or decrypt individual ones of the multiple pieces of data, respectively; and
utilizing a system that avoids reusing previously utilized seeds.

2. The method of claim 1, wherein individual ones of the random selection of seeds are neither primes nor quasi-primes.

3. The method of claim 1, wherein the step of using a computing device to provide a random selection of seeds comprises randomly selecting the random selection of seeds from a pool of previous randomly selected seeds.

4. The method of claim 1, wherein at least some of the random selection of seeds comprise over a thousand digits.

5. The method of claim 1, wherein at least some of the random selection of seeds comprise over ten thousand digits.

6. The method of claim 1, wherein the at least one function comprises taking an inverse of individual ones of the random selection of seeds.

7. The method of claim 1, wherein the at least one function comprises taking a root of individual ones of the random selection of seeds.

8. The method of claim 7, wherein the root is a square root or cube root.

9. The method of claim 7 wherein the root is a fractional root.

10. The method of claim 1, further comprises applying a first function against a first subset of the random selection of seeds, a second function against a second subset of the random selection of seeds, and wherein the first function is different from the second function, and the first subset is different from the second subset.

11. The method of claim 1, wherein at least some of the one-time pads comprise at least 10,000 digits.

12. The method of claim 1, wherein at least some of the one-time pads comprise at least as many digits as data positions in the corresponding pieces of data being encrypted.

13. The method of claim 1, wherein binary representations of at least some of the one-time pads comprise at least as many digits as digits in binary representations of the corresponding pieces of data being encrypted.

14. The method of claim 1, further comprises making available to a recipient for decryption of an encrypted message, multiple ones of the random selection of seeds.

15. The method of claim 1, wherein the system avoids reusing previously utilized seeds by storing representations of previously utilized seeds, and rejecting for use individual ones of the random selection of seeds that matched the previously utilized seeds.

16. The method of claim 1, wherein the system avoids reusing previously utilized seeds by never reusing for encryption any of the previously utilized seeds.

* * * * *